United States Patent [19]
Ehrlich

[11] 3,817,569
[45] June 18, 1974

[54] TRAILER SIDE PANEL CONSTRUCTION
[75] Inventor: Donald J. Ehrlich, Monon, Ind.
[73] Assignee: Monon Trailer Inc., Monon, Ind.
[22] Filed: Oct. 25, 1972
[21] Appl. No.: 300,663

[52] U.S. Cl............... 296/28 M, 52/592, 296/31 R
[51] Int. Cl............................................ B62d 33/04
[58] Field of Search........... 296/28 M, 31 R; 52/592

[56] References Cited
UNITED STATES PATENTS

| | | | |
|---|---|---|---|
| 1,326,054 | 12/1919 | Hicks | 52/592 |
| 1,356,348 | 10/1920 | Evans | 52/592 X |
| 3,003,810 | 10/1961 | Kloote et al. | 296/28 M X |
| 3,175,520 | 3/1965 | Talmey | 296/28 M X |
| 3,266,837 | 8/1966 | Stricker, Jr. et al. | 296/28 M |
| 3,393,920 | 7/1968 | Ehrlich | 296/28 M |
| 3,613,327 | 10/1971 | Hall | 52/592 X |

*Primary Examiner*—David Schonberg
*Assistant Examiner*—David M. Mitchell
*Attorney, Agent, or Firm*—Olson, Trexler, Wolters, Bushnell & Fosse, Ltd.

[57] ABSTRACT

The embodiment of the invention disclosed herein is directed to a wood fabricated wall-forming structure used in the manufacture of trailer truck bodies, or the like.

10 Claims, 7 Drawing Figures

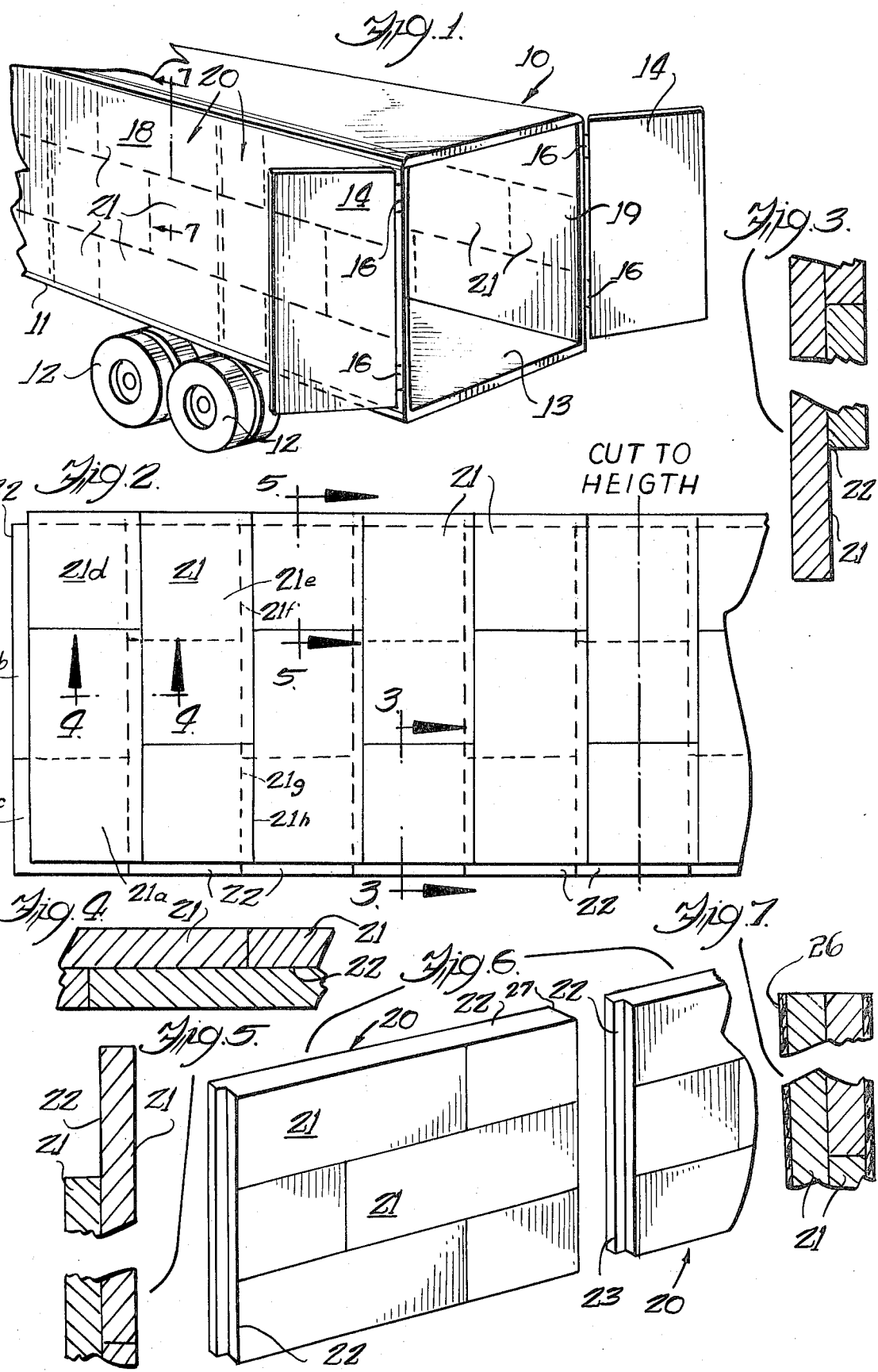

3,817,569

TRAILER SIDE PANEL CONSTRUCTION

BACKGROUND OF THE INVENTION

The transport of goods by use of trailer trucks is a well known and recognized necessity within industrial societies. Large trailer trucks many times are the only means of transporting goods from place to place. The cost of shipping goods within trailer trucks is determined by such things as the overall weight of the vehicle, including the weight of the trailer itself. Large trailer trucks constructed of steel and sheet metal are relatively strong for the purpose intended but they themselves add substantial weight to the axles, thus causing increased wear and tear on the tires and road surface over which the trailer trucks travel. Such metal trailer truck bodies also have a disadvantage in that during loading and unloading thereof cartons, pallettes, or lift forks inadvertently are urged against the internal wall surface thus causing a dented appearance on the outside thereof. The wear and tear of normal use of a metal trailer body causes the paint to chip off and eventual rusting takes place to further detract from the general appearance of the trailer body and also to weaken the structure. Additionally, metal trailer bodies are relatively expensive to manufacture.

SUMMARY OF THE INVENTION

Accordingly, it is an object of this invention to provide a trailer truck wall structure which is relatively light, compared to heavy metal structures, substantially rust proof, and inexpensive to manufacture.

Another object of this invention is to provide a trailer truck wall structure wherein bumping into the wall and the interior of the trailer does not cause dents to form on the exterior of the trailer.

Briefly, wall portions for use in truck trailers are fabricated by securing together a plurality of 4 × 8 panels of material such as plywood or the like. The 4 × 8 panels form a plurality of sub-panels each having opposite flat surfaces of substantial area and relatively thin edges with respect to the flat surfaces. The sub-panels are arranged so that a margin portion is defined about the periphery of the flat area immediately adjacent to the thin edges thereof. The 4 × 8 subpanels are then secured to one another, for example, by glueing the flat surfaces of opposite panels in direct contact with one another and with the marginal portions of the sub-panels being laterally displaced but immediately adjacent to the thin edges. This marginal portion of the sub-panels is then placed in registry with a marginal portion of the other sub-panel and glued together. The glueing of the sub-panels can take effect either under pressure, heat, or both. A plastic or other coating applied to the outer surface of the panels provides a decorative finish and makes the wood panels substantially water proof.

Many other objects, features, and advantages of this invention will be more fully realized and understood from the following detailed description when taken in conjunction with accompanying drawings, wherein like reference numerals throughout the various views of the drawings are intended to designate similar elements or components.

DESCRIPTION OF THE DRAWINGS

FIG. 1 is a fragmentary view of a truck trailer constructed with the fabricated wall-forming units of this invention;

FIG. 2 is a plan view showing the fabrication of the wall-forming units of this invention;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2;

FIG. 6 is an exploded perspective view showing the relationship between two wall sections which are connected together to form the trailer truck sidewall of FIG. 1; and FIG. 7 is a sectional view which illustrates the plastic coating applied to the wood panels forming the wall units of this invention.

DETAILED DESCRIPTION OF THE ILLUSTRATED EMBODIMENT

Referring now to FIG. 1, there is seen a truck trailer of the type to be hauled over the road by a tractor by means of a fifth wheel connection therebetween, the truck trailer here being designated by the reference numeral 10. The truck trailer 10 includes a large body 11 which is supported by a plurality of tandem wheels 12 in a conventional manner. An opening 13 is provided at the rear of the body 11 for placing goods therein. The opening 13 may be covered with a pair of swinging doors 14 pivotally secured to the outer walls of the body by means of hinges 16.

In accordance with this invention, the body 11 has the side walls 18 and 19 thereof, constructed of main panel sections 20 secured together so as to form a truck trailer of the desired length. Most advantageously, the main panels 20 are formed of a plurality of sub-panels 21. Preferably the sub-panels 21 are arranged in double thickness with a main area portion of one panel in registry with a main area portion of another panel, and with margin portion 22 about the main area portion overlying the marginal portion of the adjacent panel so that the thin edge portion 23 thereof, abut with the immediately adjacent panels. The sub-panels 21 may be glued together under heat, pressure, or both in a continuous fashion as illustrated in FIG. 2 more specifically, the elongated units or panels 21 are assembled in staggered relationship and are alternately cut in half so that, for example, panel 21a overlies and is adhesively secured to panel 21b and half panel 21c, and half panel 21d supplements panel 21a and overlies and is secured to panel 21b. Successive panels are assembled in a similar but alternate fashion. Thus, panel 21e overlies and is secured to half panel 21f and panel 21g and panel 21h also overlies and is secured to panel 21g. In addition, the upper or outer units or panels 21a, 21d, 21e, and 21h are diagonally offset with respect to their associated inner panels as shown. This arrangement provides the aforesaid narrow margins or flanges 22 projecting from the inner panels along one longitudinal edge of the continuous strip and a corresponding narrow margin or flange 27 projecting from the upper or outer panels along an opposite longitudinal edge of the strip. These flanges are thus located to project from opposite ends of the main panels 20 when the main panels are cut from the strip as described below. Similar upper and lower flanges are presented between each of the adjacent sets of upper and lower panels or units 21 so that all of the edges of the upper panels are offset from corresponding edges of the lower panels to which they are secured for increasing the strength and impact resistance of the overall structure. The main panels 20 are then cut from the continuous length so that the desired height of the panel, from the bed surface of the body to the roof thereof, is selected and cut along the cut line as indicated in FIG. 2. A plurality of the precut sections or main panels 20 are then abutted one next to the other with their flanges 22 and 27 in overlapping relationship until the desired length of the sidewall is achieved. The sub-panels 21 may be 4 × 8 units of plywood or pressboard or the like and fabricated in a continuous fashion by laying the 4 × 8 sheets as shown in FIG. 2, or in an alternate criss-cross pattern as desired.

FIGS. 3, 4, 5, and 6 clearly illustrate the construction of the main panel 20 by use of a plurality of sub-panels 21. In these figures it can be seen that the margin about the periphery of the substantial or main areas of each of the panels overlies the similar marginal portion of an immediately adjacent panel. The main panel section 20 is laminated with a sheet 26 of plastic impregnated fiber glass fabric or woven roven on at least the outer side and preferably on both sides as shown in FIG. 7. This further increases the strength and impact resistance of the structure and completely seals the wood panels against moisture.

By providing a truck body in accordance with the principles of this invention a relatively light weight, rigid, and inexpensive structure is obtained while still being sufficiently strong enough for the use intended.

While a specific and detailed embodiment is illustrated herein it will be understood that variations and modifications may be effected without departing from the spirit and scope of the novel concepts as set forth in the following claims.

The invention is claimed as follows:

1. A fabricated wall-forming structure for sides of a trailer comprising, a plurality of main rectangular panels, each of said main panels including a plurality of inner and outer sub-panels and half sub-panels having opposite flat surfaces of substantial area and relatively thin edges with respect to said flat surfaces, said inner and outer sub-panels and half subpanels being diametrically offset, such that each of said sub-panels and half sub-panels have a narrow marginal portion of said flat surfaces exposed along adjacent edges, means securing the sub-panels and half sub-panels together with the outer sub-panels and half sub-panels in a first alternate relationship and the inner sub-panels and half sub-panels in an opposite alternate relationship and with opposed flat surfaces in direct contact with one another and said narrow marginal portions of inner and outer sub-panels and half sub-panels in overlapping relationship, and said main panels being disposed in end to end abutting relationship and including inner and outer end flanges in overlapping and interconnected relationship.

2. The fabricated wall-forming structure according to claim 1, wherein the said sub-panels are formed of 4 × 8 panel members.

3. The fabricated wall-forming structure according to claim 1, wherein said 4 × 8 panel members are formed of laminated wood units.

4. The fabricated wall-forming structure according to claim 1, wherein said plurality of sub-panels are held together by glueing.

5. The fabricated wall-forming structure according to claim 1, wherein said plurality of sub-panels are laminated with a fiber glass sheet means and plastic material.

6. A trailer body construction for use in over the road vehicles comprising, a support floor mounted on wheel means, opposite side wall structures extending outwardly from the support floor along the length thereof, each of said sidewall structures including a plurality of main panels respectively extending for the full height of the wall structure and for a part of the length of the wall structure, said main panels respectively having abutting end edges and overlapping inner and outer narrow flanges along the abutting end edges, said main panels being adhesively secured together, each of said main panels including a plurality of inner and outer superimposed sub-panels and half sub-panels having opposite flat surfaces of substantial area, said outer sub-panels and half sub-panels being disposed in a first alternate relationship and said inner sub-panels and half subpanels being disposed in an opposite alternate relationship and being diagonally offset with respect to the outer subpanels and half sub-panels so that all edges of said outer sub-panels and half sub-panels are offset with respect to corresponding adjacent edges of inner sub-panels and half sub-panels, and means securing the sub-panels and half sub-panels together.

7. The trailer truck body construction according to claim 6, wherein said sub-panels are formed of 4 × 8 panels.

8. The trailer truck body construction according to claim 7, wherein said 4 × 8 panels are laminated wood units.

9. The trailer truck body construction according to claim 6, wherein a set of sub-panels are secured together by adhesives.

10. The trailer truck body construction according to claim 6, wherein said plurality of sub-panels are coated with a protective coating.

* * * * *